Figure 1:
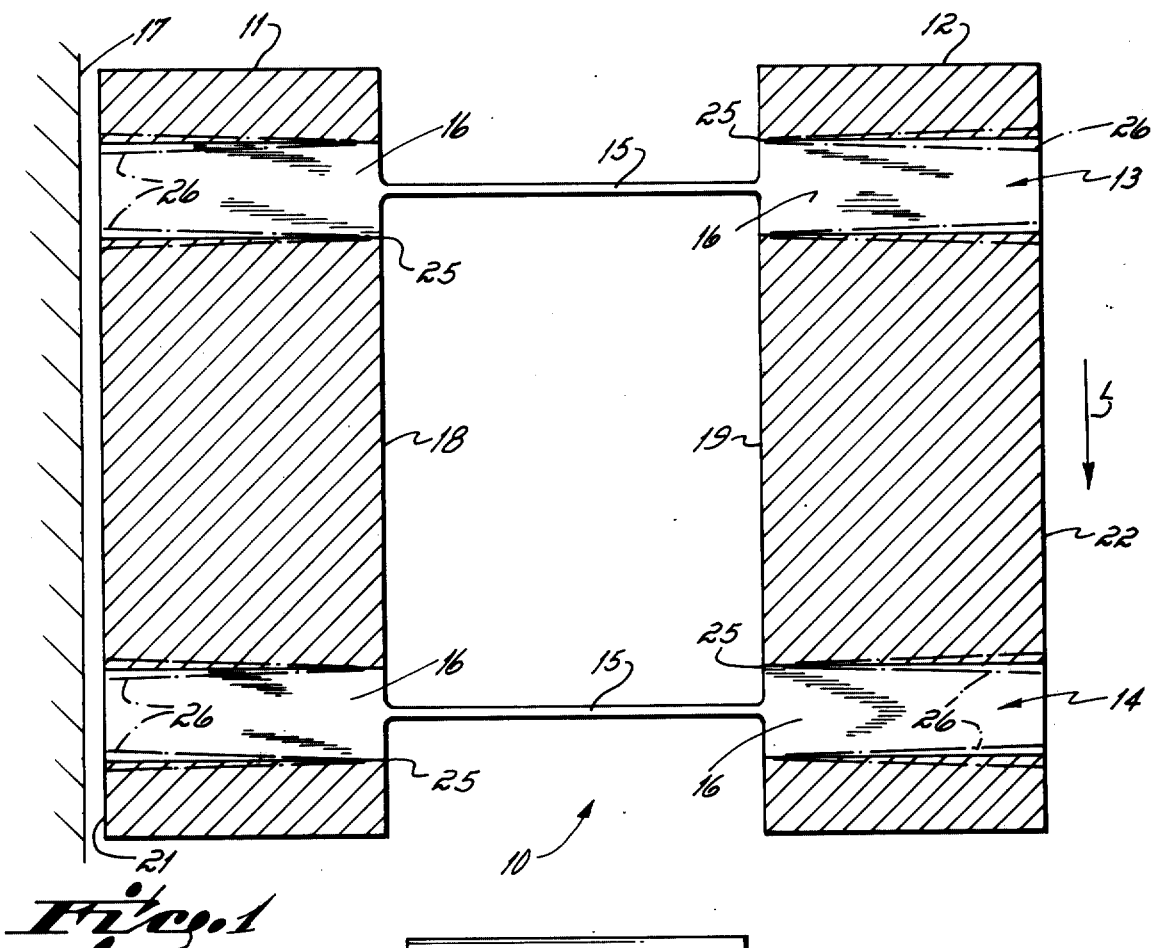

United States Patent [19]

Herrmann

[11] 4,024,372

[45] May 17, 1977

[54] METHOD OF MAKING A LOAD CELL

[75] Inventor: Robert W. Herrmann, Alliance, Ohio

[73] Assignee: Akron Standard, division of Eagle-Picher Industries, Inc., Akron, Ohio

[22] Filed: Dec. 19, 1975

[21] Appl. No.: 642,480

[52] U.S. Cl. .................... 219/121 EM; 73/141 A
[51] Int. Cl.² ........................................ B23K 9/00
[58] Field of Search ............ 219/121 EB, 121 EM, 219/121 L, 121 LM; 73/141 A

[56] References Cited

UNITED STATES PATENTS

| | | | |
|---|---|---|---|
| 2,997,875 | 8/1961 | Moore | 73/141 A |
| 3,224,519 | 12/1965 | Fletcher et al. | 73/141 A X |
| 3,319,536 | 5/1967 | Kohl et al. | 219/121 EB X |
| 3,433,923 | 3/1969 | McNabb | 219/121 EB |
| 3,562,888 | 2/1971 | Settle | 219/121 EB |
| 3,927,560 | 12/1975 | Farr | 73/141 A |

Primary Examiner—Bruce A. Reynolds
Assistant Examiner—Mark Paschall
Attorney, Agent, or Firm—Wood, Herron & Evans

[57] ABSTRACT

An improved load cell comprises flexing elements and support structure connected thereto by welding. Each flexing element has enlarged end portions, extending through openings in the support structure, and an intermediate flexing portion extending between the support structures. The enlarged end portions are welded to the end plates by electron beam welding so that the stress and strain characteristics of the intermediate flexing portions, between the end plates, are not modified from their pre-welded state.

17 Claims, 2 Drawing Figures

METHOD OF MAKING A LOAD CELL

This invention relates to load cells, and more particularly to an improved method for making a load cell.

Load cells are well known in the prior art for use in measuring forces and weights, for example. In a typical cell, two opposite end plates are integrally connected by intermediate flexures or flexing elements. One end plate is fixed, while another is connected to the load. The loading bends the flexures and causes a strain gage, associated with one of the flexures, to accurately indicate strain caused by the flexing of the flexure. The load cell thus indicates the load in desired terms and in accordance with the known physical characteristics of the flexures and strain gage.

Such load cells are used in applications to measure any load. For accuracy and repeatability, in such load cells it is important to utilize flexures having uniform characteristics throughout their flexing portions so that the strain, exhibited by each flexure under load, is in linear proportion to the stress of the load on the flexure throughout the cell's designed load range. Correspondingly, it is desirable for the load cell to return to its "zero" condition when unloaded after each measurement. If the flexures cannot bear the imparted load or stress within their proportional limits, they exhibit a hysteresis and will not return to a zero strain gage indication.

As a result of these performance parameters, it has been found that mechanical joining of flexures to end plates is not feasible. Any slippage, however slight, between the flexures and end plates will result in non-linear, inaccurate measurements.

Further, I have found it unsuitable to weld flexures to end plates by normal techniques since such would encompass welding a portion of the bending area of the flexure to the end plates. The high heat attendant the welding so heats and anneals at least portions of the bending areas of the flexures that their physical characteristics such as their crystalline structure and stress and strain properties are changed from the pre-welded state. Such manufacturing changes change the original design load specifications and the so modified cell most likely will not function accurately within the above parameters throughout the desired load range.

For example, changes in the physical characteristics of a flexure by excessive heating can result in a substantial reduction in the proportional limit of the flexure. The subsequent application of a load at the upper end of the design load range could permanently strain the flexure beyond its proportional limit so that the cell would not return to zero when the load was removed. Accurate load measurement would be impaired since the resulting relationship of stress and strain would not be linear.

It has thus been found previously necessary to manufacture high performance load cells from integral pieces of material, for example, by rough cutting the entire cell (including flexures and end plates) from a single block of material and then milling and finishing the entire integral cell. Such milling of the complete cell from a single piece of material is expensive and time-consuming.

Otherwise, and if separate flexures are to be welded to the end plates, the welded structure (including flexures and end plates) must then be completely hardened to insure that the stress and strain characteristics of the flexures are not modified by the welding heat. The entire welded unit then must be finished by further machining, such as milling or grinding; and this is rendered difficult and expensive since the end plates are hardened pursuant to hardening the flexures.

It has thus been one objective of my invention to provide an improved method for making load cells.

A further objective of my invention has been to provide a method by which useful high performance load cells can be manufactured by welding separately made flexures to end plates without subsequent hardening.

A further objective of my invention has been to provide a method by which a load cell can be manufactured by welding flexures to end plates such that the physical characteristics of the flexures in their critical bending or flexing areas are not changed by the welding.

To these ends, my load cell has two end plates and at least one flexure or flexing element having a flexing portion and two end portions, each of which is welded to a respective end plate without changing the physical stress and strain characteristics of the flexing element between the end plates, particularly the flexing portion.

In a preferred embodiment, each of the flexure's end portions is enlarged and is disposed within corresponding openings of the respective end plates where it is welded thereby by the highly localized application of an electron beam from an outward side of each end plate. Despite the normally crystalline structural changes which would normally be expected in bending portions of flexures welded to end plates, welding heat accompanying my methods of electron beam welding flexures to end plates is so localized at the interfaces of the enlarged end portions and the end plates that it is not conducted to the relatively remote flexing portion in sufficient quantity to change the stress and strain characteristics of any part of the flexing portion.

Hardening of the separate flexures can thus be performed prior to their joining with the end plates and is not affected, in critical flexing areas, by subsequent welding. Thus, highly critical flexures can be machined and treated precisely and economically prior to assembly. They can then be joined by welding to the end plates without alteration of their structure by heat. Correspondingly, the less critical end plates need not be hardened and can be much more easily finished. Of course, the necessity of machining the complete cell from an integral block of material is totally eliminated, and the end plates can be constructed of different materials than the flexures, if desired.

Figure 2:
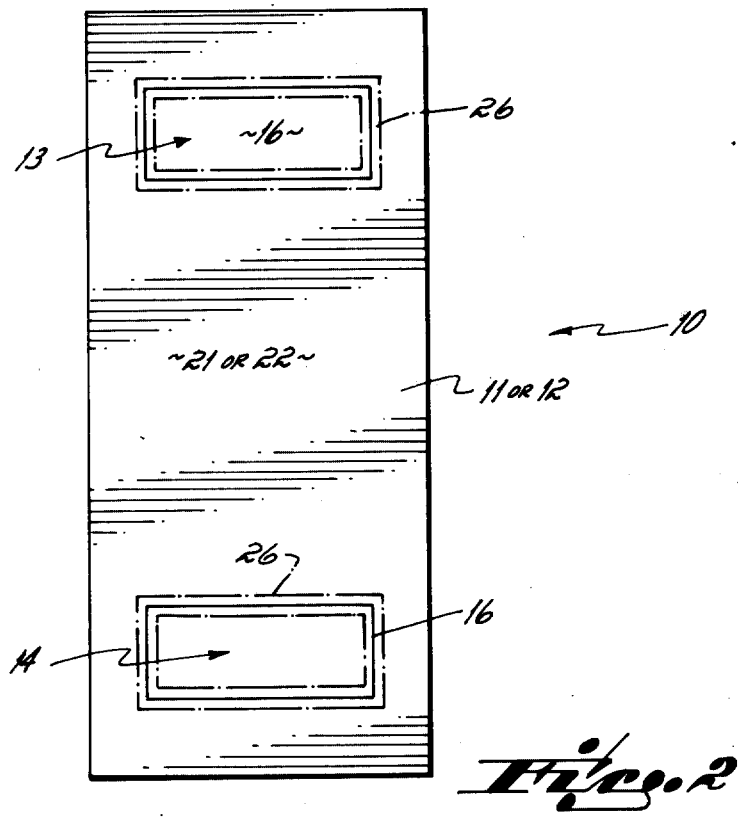

These and other objectives and advantages of the invention will become readily apparent from the following detailed description and the drawings in which:

FIG. 1 is a diagrammatic side view of a load cell showing two end plates in cross section and two flexing elements; and FIG. 2 is an end view of the load cell of FIG. 1.

Turning now to the drawings, FIG. 1 thereof is a diagrammatic illustration of a load cell 10 according to the invention. The load cell includes opposite end plates 11 and 12 and flexures, sensing elements, or flexing elements 13 and 14. Each of the flexures includes a flexing or bending portion 15 and two enlarged opposite end portions 16. The end portions have a predetermined length, approximately equal to the thickness of the end plates, and a thickness which is greater than the thickness of the flexing portion 15.

In a typical embodiment, the end plates are approximately ¾ inch to 1 inch thick while the flexure end portions are correspondingly long. The flexing portions may also be less than about ⅛ inch thick and as wide as desired. The specific dimensions are subject to variation depending on the particular configuration and application of the load cell. The end portions are, of course, thicker than the flexures and extend beyond each side thereof so as to form a "dumbbell-like" shape as shown in the drawings. In this regard, the drawings herein are somewhat enlarged throughout portions thereof (for example, the end plate thickness and end portion length is exaggerated) in order to more graphically illustrate the structure and methods disclosed herein. Also, it should be noted that the flexures and end plates in a preferred embodiment are separately made of similar material such as a high alloy, low carbon steel which has been found useful in preventing cracking. Of course, the flexures and end portions can be made of differing materials if desired.

Each end plate is provided with openings which correspond in shape to the shape of the enlarged end portions of the flexures, and each enlarged end portion is disposed within one of the openings. The enlarged end portions are fixed to the end plates by welding interface surfaces of the end portions to adjacent interface surfaces defining the openings in the end plates in a manner to be hereinafter described. Additionally, an electrical strain gage (not shown) of any suitable type such as, for example, a foil or semiconductor gage of known construction, is attached to at least one of the flexures on the flexing portion 15.

One of the end plates, such as end plate 11 for example, is adaptable for connection to a fixed member 17, while the other end plate 12 is adapted for connection to a load, demonstrated graphically by the arrow L. Thus, when a load L is applied to the end plate 12, the flexures 13 and 14 bend or flex within the critical flexing portions 15. The strain gage associated with at least one of the flexing portions 15 gives an indication of the degree of bend or flex of the flexure and thereby of the magnitude of the load L which is applied to the end plate 12. The load cell can be calibrated by conventional instrumentation so that the strain gage is set up to give an extremely accurate reading of the load L in desired terms.

As shown in FIG. 1, each of the flexures 13 and 14 has a flexing portion 15 which is located between opposing inward end faces 18 and 19 of the respective end plates 11 and 12. The stress and strain characteristics of the flexure, throughout this critical flexing portion, must be maintained uniform throughout the making of the cell so that when the cell is loaded or stressed, linear proportion to the stress or load L and so that this relationship obtains for old loads with which the cell is designed to be used.

To insure that the linear stress and strain relationship characteristics of the flexures are maintained despite subsequent welding, I have conceived a unique method of manufacturing the load cells by a specialized welding technique. An enlarged end portion 16 is slipped into its respective rectangular opening in an appropriate end plate so that a space of approximately 0.002 inch to about 0.005 inch is maintained between the faces of the end portion 16 and the faces of the opening. Of course, the tolerance may vary outside this range depending, among other things, on the specific welding process used. Further, the opening need not necessarily be a rectangular hole as shown. Rather, the end portion 16 may be laid on any surface of the support structure and electron welded thereto.

Thereafter, an electron beam welding apparatus of any suitable type is disposed in an operable position with respect to the outer face (21 or 22) of the respective end plate (11 or 12). During relative movement between the end plate and the electron beam welding apparatus, an electron beam is generated and is directed into the end plate from its outer side. The beam is focused to a depth corresponding to the inward face of the plate such as illustrated, for example, at focus points 25 of FIG. 1, and essentially traces a rectangular path defined by the openings in the end plate, (or a path corresponding to the cross-sectional shape of the flexure's end portion).

Heat generated by the electron beam within the end plate and the corresponding sides of the enlarged end portion 16 is sufficient to positively weld the faces of the end portion 16 to the corresponding opposing faces of the respective opening in the end plate. Since the beam is focused at the inward face of the end plate, the electron beam typically welds the end portions 16 and the end plates throughout a tapered zone illustrated by the illustrative phantom lines 26 in FIGS. 1 and 2.

The combination of the structure of the flexure and of the welding technique disclosed results in the secure integration of flexure to end plate by welding, but without heating the remote flexing portion of the flexure to such an extent as would change its stress and strain characteristics. Due to the accurate focusing of the electron beam, the heat it generates is substantially limited to a highly localized area as compared to larger heated zones attendant welding techniques of more conventional nature. In particular, the direct heat applied to the end portion 16 of each flexure nearest the flexing portion 15 by the electron beam is at any time concentrated at a single point. Further, since the end portions 16 are enlarged, the electron beam is, throughout most of its path, spaced from the remote flexing portion. Heat which is conducted through the enlarged end portion 16 to any portion of the flexing portion 15 is not significant and will not change the physical stress and strain characteristics of the flexing portion 15.

Moreover, the electron beam rearwardly of the focal point 25 is very thin and in passing to its focal point fuses or welds only a thin layer of metal on the respective opposing surfaces to effect bonding of flexure to end plate. Thus, heat produced by welding is localized at the interfaces so that it is not conducted to the remote flexing portion in sufficient quantity to change the stress and strain characteristics of the flexing portion. Crystalline structure of the flexing portion is unchanged despite the welding of flexure to end plate.

Thus, despite the fact that the flexures or flexing elements 13 and 14 are welded to the respective end plates, the heat of the welding does not change the physical characteristics of the flexing portions 15. Assuming that the flexures 13 and 14 have been chosen of appropriate materials and have been treated, if necessary, in a desired manner, further hardening of the flexure members is not required, nor, of course, is it required to harden the end plates 11 and 12.

Accordingly, the treating steps which were normally expected to have been required subsequent to welding are thereby eliminated, and it is no longer necessary to harden the complete load cell, including both flexures and end plates. As a result, the end plates 11 and 12, for example, may be more easily finished after welding than if they had been hardened prior to finishing as would be required in a normal welding technique where heat modified the flexing portions.

Of course, the flexure 13 and 14 can be hardened prior to assembly to the end plates according to the above in order to exhibit the appropriate stress and strain characteristics desired. Subsequent welding according to the invention will not modify these characteristics.

Also, it should be appreciated that the plates could be of any suitable configuration, for example, circular, and that any number of flexures could be used in accordance with the invention. In addition, it should be noted that the flexures could be a different shape, the welded portions of the flexures remaining separated from the flexing portions 15 of the flexures so that the flexing portion suffers no modification of its stress and strain characteristics due to the welding at remote areas.

Accordingly, the improved method of manufacturing a load cell provides means by which flexures or flexing elements and end plates of a load cell can be manufactured and treated independently of each other and thereafter combined by welding without effecting the physical stress and strain characteristics of the critical flexing portions. Critical flexures may be machined and treated precisely and economically prior to assembly, then joined to end plates without alteration of structure caused by heat. Previously necessary expensive and difficult milling, grinding and finishing steps can be eliminated, yet the flexures maintain their desired characteristics for the particular load cell in which they are utilized.

These and other advantages and modifications will become readily apparent to one of ordinary skill in the art without departing from the scope of the invention, and applicant wishes to be bound only by the claims appended hereto.

I claim:

1. A method of making a load cell having two end supporting structures and at least one flexing element including two ends and an intermediate flexing portion therebetween, said flexing portion being disposed between the two end supporting structures, and said ends and said end supporting structures having respective adjacent interface surfaces, the method comprising the step of:
   applying localized welding energy to said interface surfaces to weld them together, said localized welding energy being sufficient to weld the flexing element to the supporting structures at said interface surfaces without changing the physical stress and strain characteristics of any portion of the flexing element between the supporting structures.

2. A method as in claim 1 wherein the welding step includes electron beam welding said ends to said supporting structures.

3. A method as in claim 2 wherein said ends are enlarged ends thicker than said intermediate flexing element, said welding including electron beam welding respective interface surfaces of said enlarged ends to respective interface surfaces of said supporting structures.

4. A method as in claim 3 including the step of inserting said enlarged ends into respective openings in respective end supporting structures prior to said welding.

5. A method as in claim 4 wherein said supporting structures comprise end plates each having an inward side facing an opposing plate and an outward side, and wherein said welding step includes electron beam welding said adjacent interface surfaces together from an outward side of each respective end plate.

6. A method as in claim 3 wherein the load cell includes a plurality of flexing elements connected between said supporting structures and including the step of:
   electron beam welding respective ends of each of said flexing elements to respective supporting structures.

7. A method as in claim 3 including the steps of:
   manufacturing said flexing element and said end supporting structures from metals having different physical characteristics, and
   thereafter joining said flexing element to said supporting structures by electron beam welding.

8. A method as in claim 3 including the step of hardening the flexing element prior to said electron beam welding.

9. A method as in claim 1 wherein said welding includes welding the ends of the flexing element to the supporting structures without changing the crystalline structure of the intermediate flexing portion from its pre-welded state.

10. A method as in claim 1 including the step of hardening said flexing element prior to welding.

11. A method of making a load cell having two end plates and at least one flexing element having two ends and an intermediate flexing portion therebetween, said flexing portion being disposed between the two end plates, the method comprising the step of:
   electron beam welding each end of said flexing element to a respective end plate without changing the crystalline structure of any portion of the flexing element between the end plates.

12. A method of making a load cell having two end plates and at least one flexing element having two ends and an intermediate flexing portion therebetween, said flexing portion being disposed between the two end plates, the method comprising the step of:
   welding each end of said flexing element to a respective end plate without changing the physical stress and strain characteristics of the intermediate flexing portion.

13. A method as in claim 12 wherein the welding step includes electron beam welding said ends to said plates.

14. A method as in claim 13 wherein said ends are enlarged ends thicker than said intermediate flexing element, said welding including electron beam welding faces of said enlarged ends to said end plates.

15. A method of making a load cell having two end supporting structures and at least one flexing element including two ends and an intermediate flexing portion therebetween, said flexing portion being disposed between the two end supporting structures, and said ends and said end supporting structures having respective adjacent interface surfaces, the method comprising the step of:
   applying localized electron beam welding energy to said interface surfaces to weld them together, said localized electron beam welding energy being sufficient to weld the flexing element to the supporting structures at said interface surfaces without changing the crystalline structure of the intermediate flexing portion.

16. A method of making a load cell having two end supporting structures and at least one flexing element including two ends and an intermediate flexing portion therebetween, said flexing portion being disposed between the two end supporting structures, and said ends and said end supporting structures having respective adjacent interface surfaces, the method comprising the step of:
applying localized electron beam welding energy to said interface surfaces to weld them together, said localized electron beam welding energy being sufficient to weld the flexing element to the supporting structures at said interface surfaces without changing the physical stress and strain characteristics of the intermediate flexing portion.

17. A method of making a load cell having two end supporting structures and at least one flexing element including two ends and an intermediate flexing portion therebetween, said flexing portion being disposed between the two end supporting structures, and said ends and said end supporting structures having respective adjacent interface surfaces, the method comprising the step of:
applying localized electron beam welding energy to said interface surfaces to weld them together, said localized electron beam welding energy being sufficient to weld the flexing element to the supporting structures at said interface surfaces without changing the physical stress and strain characteristics of any portion of the flexing element between the supporting structures.

* * * * *